United States Patent [19]
Ledieu et al.

[11] Patent Number: 5,312,718
[45] Date of Patent: May 17, 1994

[54] METHOD OF MANUFACTURING DIES FOR PRESSING OPTICAL DISKS

[75] Inventors: Jean Ledieu, Crespieres; Jean-Francois Dufresne, Caen, both of France

[73] Assignee: Digipress, Caen Cedex, France

[21] Appl. No.: 5,289

[22] Filed: Jan. 19, 1993

[30] Foreign Application Priority Data

Jan. 24, 1992 [FR] France ............... 92 00778

[51] Int. Cl.$^5$ .............................. C25D 1/10
[52] U.S. Cl. ......................... 430/320; 430/321; 430/945; 430/273; 430/275; 430/256; 205/68
[58] Field of Search .......... 430/321, 945, 273, 256, 430/275, 320; 205/68, 70, 79; 265/2.5

[56] References Cited

U.S. PATENT DOCUMENTS 5,004,660  4/1991  Van Andel et al. ............... 430/17
5,166,014  11/1992  Ledieu ............................. 430/16

FOREIGN PATENT DOCUMENTS 323678  7/1989  European Pat. Off. .
325330  7/1989  European Pat. Off. .
328212  8/1989  European Pat. Off. .
353392  2/1990  European Pat. Off. .
429346  5/1991  European Pat. Off. .
447711  9/1991  European Pat. Off. .

OTHER PUBLICATIONS

English language abstract of JP 4-21940, Omori et al., "Production of Master Disk for Optical Disk", Jan. 1992.

Primary Examiner—Charles L. Bowers, Jr.
Assistant Examiner—John A. McPherson
Attorney, Agent, or Firm—Pollock, VandeSande & Priddy

[57] ABSTRACT

An optical disk die is manufacture from a laminated disk which includes a substrate, an overlying heat sensitive layer, a reflective layer, and a final output protective layer. A laser beam forms micro-pits in the heat sensitive layer. These micro-pits become exposed after removal of the protective and reflective layers. A thin metallic coating is deposited over the surface of the pitted heat sensitive layer wherein the contours of the micro-pits are followed. A thicker second metallic layer is deposited over the first metallic layer and has an interface with the first metallic layer which duplicates a pattern of the micro-pits. Finally, the deposited second layer is separated from the remainder of the laminated disk thereby forming a die having the micro-pit pattern therein.

7 Claims, 1 Drawing Sheet

METHOD OF MANUFACTURING DIES FOR PRESSING OPTICAL DISKS

FIELD OF THE INVENTION

The present invention relates to a method of manufacturing dies for pressing disks, in particular optical disks.

BACKGROUND OF THE INVENTION

The state of the art relating to the manufacture of such dies consists in particular in depositing on a glass support or substrate, a photosensitive resin layer, and in then recording information on this resin layer by means of a beam of an appropriate radiation, in particular a laser beam, in developing this layer, that is to say removing the parts of the latter where the information has thus been transferred so as to uncover the support in the corresponding zones, and in then creating in this support through the parts thus uncovered, micro-pits which correspond to the signal to be reproduced.

Having extracted the remaining resin, the unit constitutes a master disk from which may be obtained dies or replicas reproducing these micro-pits in relief, these dies later allowing, by pressing a material in particular of the polycarbonate kind, the production of disks which in their turn carry as depressions the pits representing the information to be read on these disks. In particular the master disk may usefully be coated with a thin metal layer, generally silver, which follows the profile of the micro-pits, before being itself covered by electroplating with a complementary nickel layer which will constitute the desired die, whilst offering projecting micro-reliefs corresponding to the micro-pits previously formed in the substrate and which, replicated in the final disk, will be readable by the customary optical methods.

A major disadvantage of this manufacturing technique resides in the need to irradiate the photosensitive resin with a laser beam, thus entailing the use of a very sophisticated machine being useable exclusively by professionals and, moreover, requiring very heavy maintenance. In particular, the laser beam must be guided by a very complicated mechanical and optical unit so as to provide, with extreme accuracy and perfect reproducibility, the exactly centred continuous spiral which will create, in the support, the very narrow imaginary groove along which the successive micro-pits are arranged.

Similarly, there is known the process for recording optical disks of the "WORM" (Write once, read many) type which consists in recording information directly on a polycarbonate substrate covered with a sensitive layer with the aid of a straightforward laser diode, it thus being possible to carry out the writing performed on the disk by means of a simple apparatus, widely available to the public and of low cost.

The "WORM" type disks are thus made up of a pre-etched substrate covered with one or more sensitive layers which are modified in contact with the beam issuing from the laser diode, in particular while producing by thermal ablation the micro-pits representing the information to be recorded.

Such disks in which the modification of the sensitive layer is accompanied by a variation in the reflectivity of the material constituting it are in particular described for example in the American patent U.S. Pat. No. 4 414 273, European patent EP-A-0 130 026 or again in the journal "Optical memories and systems" No. 72 - March 89, page 5 et seq. The recording of these disks is straightforward, easy to use even by a non-professional and requires only a relatively uncomplicated apparatus.

BRIEF DESCRIPTION OF THE INVENTION

The subject of the present invention is a method which aims to produce a die serving in the pressing of optical disks, capable of being obtained more economically than with the conventional methods, while enabling in particular the user to himself produce the desired recording by means of a standard recorder of the "WORM" type available commercially and easily useable by any not particularly specialized person, instead of a very expensive professional machine.

To this end, the method under consideration, consisting in recording by means of a standard commercial apparatus, in the form of micro-pits obtained in particular by thermal ablation, a signal corresponding to information encoded in a heat-sensitive resin layer deposited on a rigid substrate, these micro-pits being capable of being produced under the effect of a radiation issuing from a laser diode, directed towards the layer through the said substrate and guided in its displacement. The said layer being is previously covered with a thin reflective metallic coating and the latter possibly with a final external protective layer, is characterized in that it consists in removing the reflective coating and the protective layer in order to uncover the micro-pits with a view to constituting a master disk, in depositing on the resin layer thus containing the micro-pits a thin metallic coating in order to follow the profile of these micro-pits, in then depositing a final metal layer on the coating to form a printing die containing micro-reliefs corresponding to the micro-pits and finally in subsequently pressing on the said die the optical disks or the like to be manufactured. The rigid substrate is preformatted in such a way as to allow the guiding of the beam issuing from the laser diode along the groove of a continuous or discontinuous spiral, in accordance with the international standards (continuous or sampled composite preformatting), this spiral allowing the radial positioning of the beam with respect to the disk and containing a time base able to make possible the servocontrolling of the speed of rotation of the disk during the recording of information encoded in the heat-sensitive resin layer.

As appropriate, the time base incorporated within the preformatting of the disk can be obtained, either through a modulation in the continuous groove of the spiral, or to correspond to already specified formats by the abovementioned standards, at all events these arrangements allowing the use of a "WORM" type recording material, available commercially and of particularly low cost.

Advantageously, the substrate is produced in glass or polycarbonate, or again in any other appropriate material, the beam being delivered by a commercial apparatus and having a wavelength ordinarily equal to 780 nm.

The reflective coating deposited on the sensitive layer and the external protective layer are removed after recording the resin layer by mechanical peeling or else by reactive plasma, abrasion, chemical dissolution with acid or by any appropriate means.

Having performed the recording of the sensitive layer, the thin metallic coating following the profile of the micro-pits is advantageously produced in silver, the final metal layer constituting the die being obtained by electroplating growth of nickel.

Other characteristics of a method of manufacturing pressing dies for optical disks will emerge further through the description which follows of a mode of implementing this method, given by way of a non-limiting example, illustrate by the attached drawing in which:

BRIEF DESCRIPTION OF THE DRAWING

In FIG. 1 there has represented a fraction of a "WORM" disk containing in particular a substrate 10, in glass, polycarbonate or any other appropriate hard, rigid material, this substrate preferably being preformatted, that is to say containing means to ensure the guiding of a beam intended to record encoded information. A layer 11 of a material which is heat-sensitive to the radiation issuing from a laser diode (not shown in the drawing) is deposited on the substrate 10, this beam being schematized with the label f in FIG. 2. The sensitive layer 11 is itself covered with a thin reflective layer 12, this layer itself being covered with a complementary external protective layer 13, possibly of much larger thickness, generally produced by means of an organic varnish.

Figure 1:
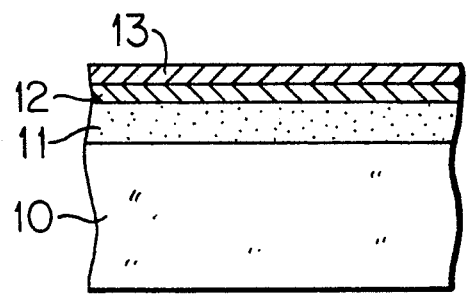
FIGS. 1 to 6 are schematic and successive views representing the treatment of a substrate allowing the desired final die to be arrived.
Figure 2:
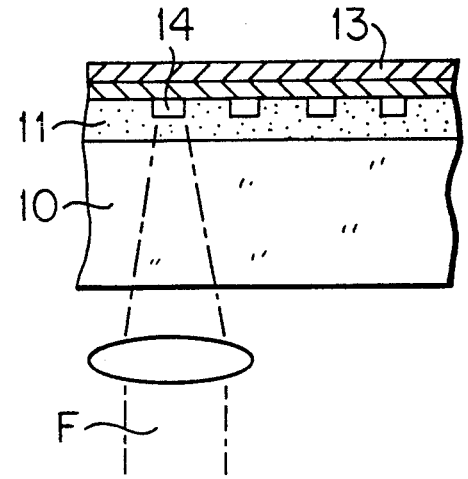

The beam f represented in FIG. 2 has a wavelength generally equal to 780 nm and is directed towards the heat-sensitive layer 11 through the substrate 10 so as to be reflected by the layer 12 applied against the heat-sensitive layer. According to an important characteristic of the invention, the substrate of the disk is preformatted, that is to say includes by manufacture a continuous or discontinuous groove, produced in accordance with the international standards, constituting as appropriate a so-called continuous or sampled composite preformatting, this groove making it possible to ensure the accurate guiding of the beam issuing from the laser diode while controlling its radial positioning so as to accurately follow the track formed by this groove. Moreover, this preformatting incorporates a time base, able to allow the servocontrolling of the relative rate of displacement of the substrate with respect to the beam this time base being constituted either by a modulation in the continuous groove, or being created from already specified formats complying with the above standards.

The beam f thus makes it possible to engender in the heat-sensitive layer 11, through thermal ablation, micro-pits such as 14 whose distribution within the layer 11 is the manifestation of encoded information to be recorded in the latter.

Figure 3:
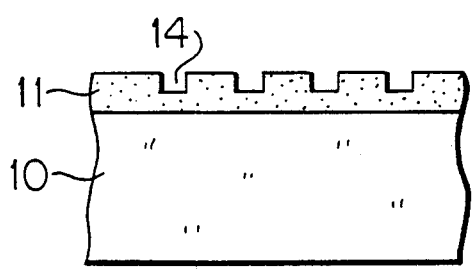

In the following step represented in FIG. 3, the lifting off of the reflective coating 12 and of the protective layer 13 which were previously arranged on the heat-sensitive layer 11 is undertaken so that the micro-pits 14 made in the latter become visible. This lifting off of the layers 12 and 13 is carried out by any suitable means, in particular by mechanical peeling, by the action of a reactive plasma, by abrasion or again by chemical dissolution.

Having carried out this operation, the substrate coated with the layer 11 endowed with its micro-pits 14 constitutes a master disk. It should be noted that, as a variant, provision can be made for directly etching the substrate 10, in particular when the latter is produced in glass, through these micro-pits as has already been described in patent application Ser. No. 89.15261 of Nov. 21, 1989 in the name of the Applicant for a "method for manufacturing an optically read disk and disks obtained by this method", making it possible in particular to preserve the latter for archive purposes.

Figure 4:
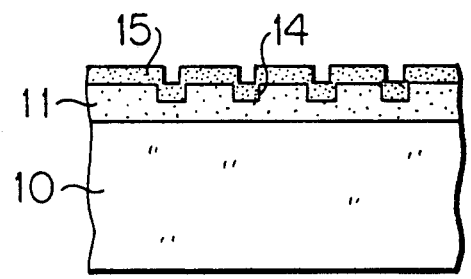

In the following step illustrated in FIG. 4, the master disk thus obtained, be it etched or not, receives a metallic coating 15 which preferably consists of silver, this coating closely following the profile of the micro-pits.

Figure 5:
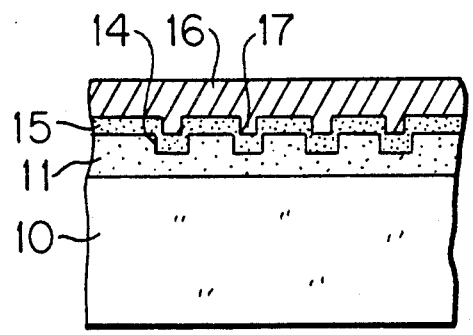

It is then possible to grow on this metallic coating, in particular through electroplating deposition, a thick layer 16 of another metal, generally nickel, which thus presents micro-reliefs 17 constituting the direct replica of the micro-pits 14, (see FIG. 5) themselves representing the recorded information.

Figure 6:
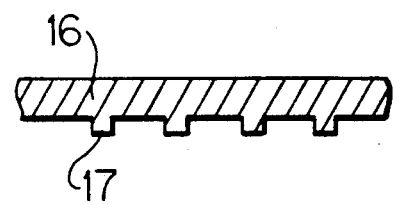

In a last step, represented in FIG. 6, the thick nickel layer 16 is separated and will thus constitute directly the desired pressing die, allowing the manufacture of disks which in their turn will reproduce as depressions the micro-reliefs 17 and hence the micro-pits 14 of the initial sensitive layer.

In this way a method of manufacturing disks, of very simple design and high efficiency, is carried out, having the advantage of being capable of being implemented by means of a commercial machine carrying out the direct recording of the information encoded in the heat-sensitive layer of the substrate. Of course, secondary modifications could be made to the method, in as far as they do not modify its essential characteristics, for example as regards the choice of materials used and the process for lifting off the complementary layers once the information is recorded.

Similarly, the sensitive layer is advantageously a heat-sensitive resin and could be of any nature allowing micro-pits to be obtained, either directly when recording by means of the radiation from the laser diode, or indirectly during subsequent steps.

Of course, the invention also extends to the die obtained by the method envisaged and to the optically read disks manufactured with the aid of this die.

We claim:

1. A method for manufacturing an optical disk die, comprising the steps:
   illuminating a laminated disk with a laser beam, the disk including—
   (a) a substrate;
   (b) an overlying heat sensitive layer;
   (c) a reflective layer deposited on the hat sensitive layer, the illumination being directed through the substrate and reflected from an internal surface of the reflective layer, causing ablated micro-pits to form in the heat sensitive layer;
   removing the reflective layer;
   depositing a first metallic layer on the pitted heat sensitive layer, the metallic layer following contours of the micro-pits;
   depositing a second metallic layer over the first metallic layer, the second metallic layer having an interface with the first metallic layer which duplicates a pattern of the micro-pits; and
   separating the deposited second metallic layer from a remainder of the laminated disk thereby forming a die.

2. The method set forth in claim 1 wherein the substrate incorporates an optically detectable beam guide track which includes positional and time base data.

3. The method set forth in claim 2 wherein the beam is generated from a laser diode positioned opposite the substrate.

4. The method set forth in claim 2 wherein the laminated disk includes an outer protective layer deposited on the reflective layer, and the protective layer is removed before removal of the reflective layer.

5. The method set forth in claim 2 wherein the first metallic layer is silver, and the second metallic layer is nickel.

6. The method set forth in claim 2 wherein the beam is generated from a laser diode positioned opposite the substrate;
and further wherein the laminated disk includes an outer protective layer deposited on the reflective layer, and the protective layer is removed before removal of the reflective layer;
and still further wherein the first metallic layer is silver, and the second metallic layer is nickel.

7. The method set forth in claim 6 wherein the protective layer is an organic varnish.

* * * * *